United States Patent [19]
Agraharam et al.

[11] Patent Number: 6,085,231
[45] Date of Patent: Jul. 4, 2000

[54] METHOD AND SYSTEM FOR DELIVERING A VOICE MESSAGE VIA AN ALIAS E-MAIL ADDRESS

[75] Inventors: Sanjay Agraharam, Marlboro; Lee Begeja, Gillette; Carroll W. Creswell, Basking Ridge; Ram S. Ramamurthy, Manalapan; Sandeep Sibal, Matawan, all of N.J.

[73] Assignee: AT&T Corp, New York, N.Y.

[21] Appl. No.: 09/002,630

[22] Filed: Jan. 5, 1998

[51] Int. Cl.[7] .................................................. G06K 5/00
[52] U.S. Cl. ............................. 709/206; 709/207
[58] Field of Search .................. 709/206, 207, 709/217; 379/88.22, 93.24

[56] References Cited

U.S. PATENT DOCUMENTS

| | | | |
|---|---|---|---|
| 5,473,143 | 12/1995 | Vak et al. | 235/380 |
| 5,557,659 | 9/1996 | Hyde-Thomson | 379/88 |
| 5,647,002 | 7/1997 | Brunson | 380/49 |
| 5,675,507 | 10/1997 | Bobo, II | 364/514 R |
| 5,717,742 | 2/1998 | Hyde-Thomson | 379/88 |
| 5,732,126 | 3/1998 | Fitzpatrick et al. | 379/67 |
| 5,943,398 | 8/1999 | Klein et al. | 379/88 |

*Primary Examiner*—Zarni Maung

[57] ABSTRACT

A subscriber to alias telephone number e-mail system can retrieve both their voice-mail messages and e-mail messages by accessing only their e-mail system. Specifically, when a calling party calls the subscriber of an alias e-mail system who is unavailable to take the call, and leaves a voice-mail message on a network-based voice-mail system, the voice-mail system stores the message. The network-based voice-mail system then determines, through a network-based database retrieval, whether the called party is a subscriber to an alias telephone number e-mail system. In such a system, e-mail messages are addressed with a name portion including a subscriber's telephone number. A translation server then translates the alias telephone number e-mail address to the subscriber's actual e-mail address and forwards the message to the subscriber. If the called party is determined to be a subscriber to such a system, the voice-mail system converts the stored voice-mail message into a text or a .WAV file and includes the converted message in an e-mail message addressed to the called party/subscriber's alias telephone number e-mail address for transmission over the Internet. The translation server then converts the alias telephone number e-mail address to the subscriber's actual e-mail address and forwards the e-mail message to the called party/subscriber's e-mail repository server at that actual address for later retrieval by the called party.

20 Claims, 2 Drawing Sheets

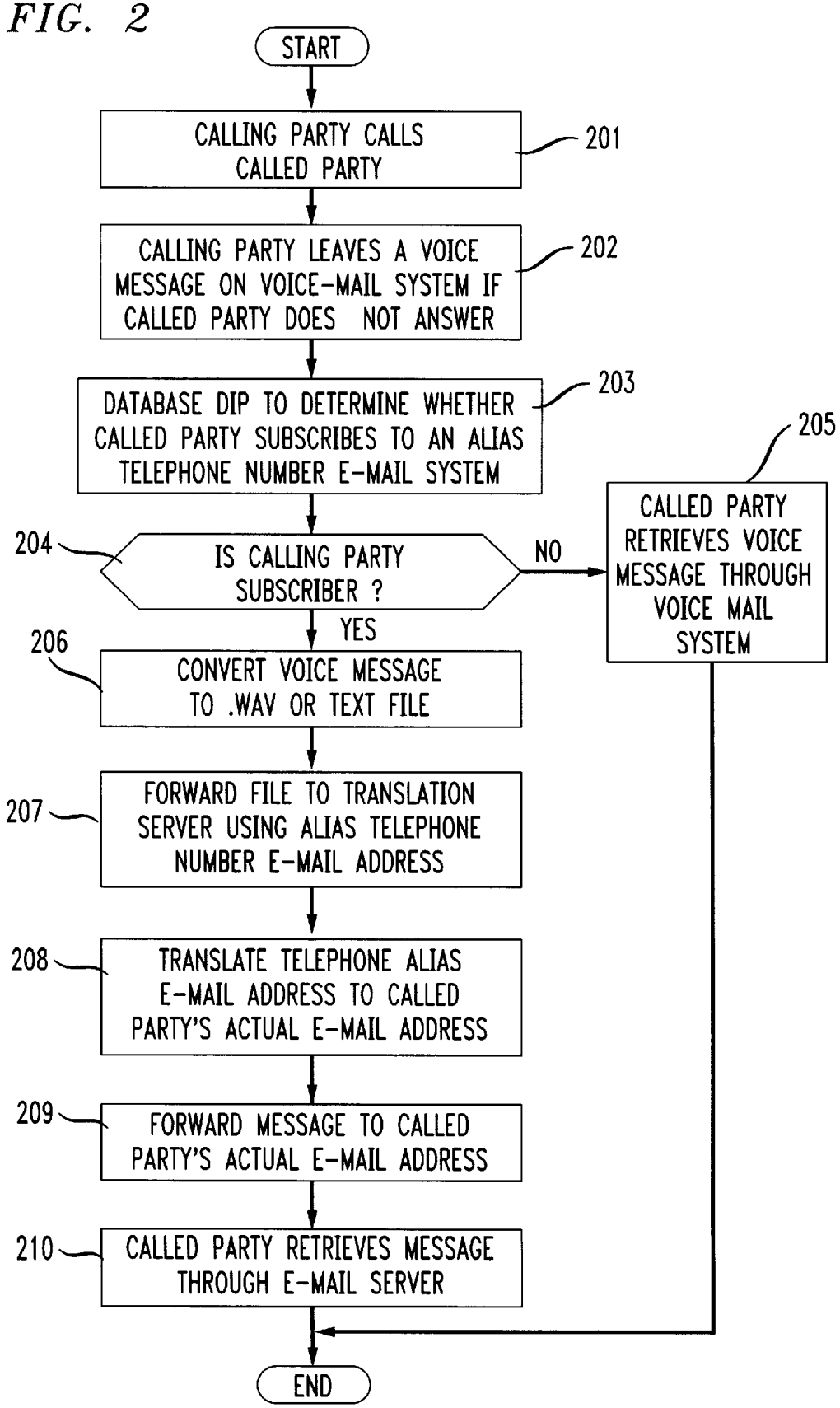

METHOD AND SYSTEM FOR DELIVERING A VOICE MESSAGE VIA AN ALIAS E-MAIL ADDRESS

TECHNICAL FIELD

This invention relates to a method and system for delivering a voice-mail message to a subscriber of an alias telephone number e-mail system via that subscriber's e-mail system.

BACKGROUND OF THE INVENTION

In U.S. Pat. No. 5,987,508, issued Nov. 16, 1999, of Agraharam et al., entitled "Method of Providing Seamless Cross-Service Connectivity in Telecommunications Network" incorporated herein by reference, a method of sending an e-mail message to a subscriber of an alias telephone number e-mail system is disclosed. As described therein, a sender of an e-mail message to a subscriber uses the subscriber's telephone number as the name portion of the intended recipient's e-mail address, together with a known domain name. A message so addressed to an alias of the intended recipient's actual e-mail address, telephone__number@known__domain__name, is sent to a translation server at that known domain name where the alias telephone number name is translated to the recipient-subscriber's actual e-mail address, and the message forwarded to the subscriber at their actual e-mail address. The subscriber is then able to retrieve his or her e-mail messages in a conventional manner when he or she logs onto their e-mail server. Advantageously, senders of e-mail messages to intended recipients who are subscribers to this service need not know their intended recipient's actual e-mail address, but only their intended recipient's telephone number. Whereas a recipient's actual e-mail address may not be readily determined, an alias telephone number e-mail address is likely to be known or can be easily obtained using conventional telephone directory assistance methods.

Although e-mail messaging is becoming a more and more popular method of contact, many people still prefer to use the telephone. Such telephone callers will often find the called party not at home or their office, or unavailable. Such called parties are likely to have voice-mail systems to which callers can leave voice-mail messages. A called party who is "computer savvy" and interacts most frequently through his or her client terminal, must then separately retrieve voice-mail messages left on their voice-mail system and e-mail messages left on their e-mail system.

SUMMARY OF THE INVENTION

In accordance with the present invention, a subscriber to a computer network-based alias telephone number e-mail system can retrieve both his or her voice-mail messages and e-mail messages by accessing only their e-mail system. Specifically, when a calling party calls the subscriber of an alias e-mail system, who is unavailable, and leaves a voice-mail message on a network-based voice-mail system, the voice-mail system stores the message. The network-based voice-mail system then determines, through a network-based database retrieval, whether the called party is a subscriber to an alias telephone number e-mail system. If the called party is determined do be a subscriber, the voice-mail system converts the stored voice-mail message into a text or a .WAV file and includes the converted message in an e-mail message addressed to the called party/subscriber's alias telephone number e-mail address for transmission over a packet-based computer network, such as the Internet. A translation server converts the alias telephone number e-mail address to the subscriber's actual e-mail address in the computer network and forwards e-mail message containing the text or .WAV file to the called party/subscriber's e-mail repository server at that actual address for later retrieval by the called party. When the called party/subscriber later retrieves his or her e-mail messages, he or she can either read the textually converted voice-mail message or hear the .WAV file through the speakers on their client terminal.

BRIEF DESCRIPTION OF THE DRAWINGS

FIG. 2 is a flowchart detailing the steps of the present invention.

DETAILED DESCRIPTION

Figure 1:
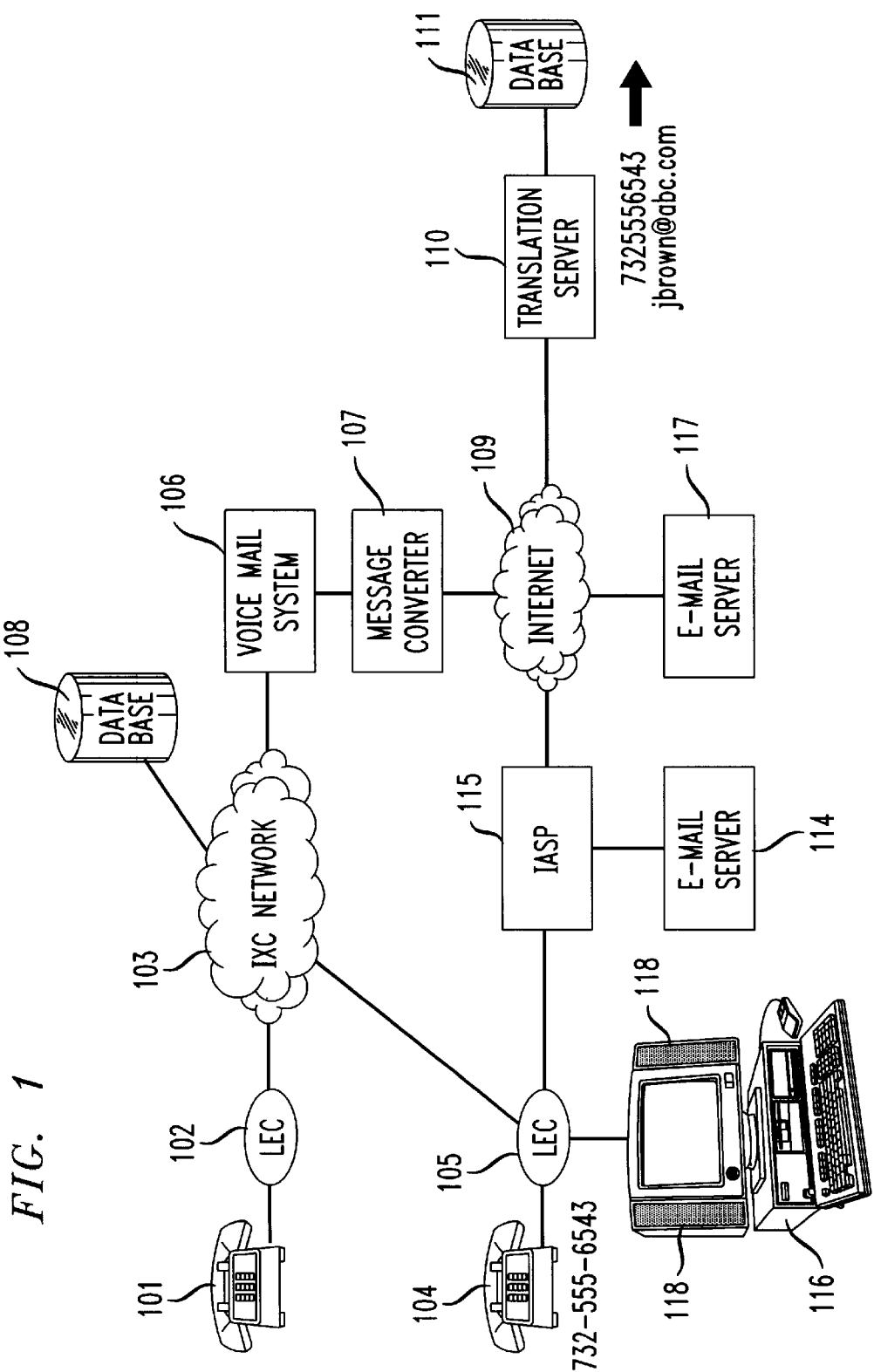
FIG. 1 is a block diagram of a system in accordance with the present invention that enables a subscriber to a network-based alias telephone number-mail system retrieve through that system messages left on their separate voice-mail system.

With reference to FIG. 1, a calling party at a station set 101 is connected through his or her Local Exchange Carrier (LEC) 102 to an Interexchange Carrier (IXC) network 103. The calling party at station set 101 is desirous of placing a call to a called party associated with station set 104. Station set 104 can be connected to the same LEC as station set 102 or to another LEC 105 as shown in the Figure. Station set 104 in turn is connected through LEC 105 to IXC 103, or may in fact be connected through LEC 105 to another IXC. For purposes of illustration only, station sets 101 and 104 are shown connected to a common IXC network 103. When the calling party at station set 101 places a call to the called party at station set 104 and the called party fails to answer the call, a network-based voice-mail system 106 instead answers the call and interactively provides an opportunity for the calling party to leave a voice message for the called party. In a conventional manner, the calling party at station set 101 can leave a voice message which is stored by the voice-mail system 106 in an analog or digital manner for latter retrieval by the called party through station set 104 or any other station set.

In accordance with the present invention, when the network-based voice-mail system 106 receives a message for a called party, the voice-mail system 106 accesses a database 108 connected to the IXC network 103 to determine whether the called party is also a subscriber to an alias telephone number e-mail system of the type described in the previously referenced co-pending patent application. If the called party is determined to be a subscriber to such an alias telephone number e-mail system, then in accordance with the invention, the voice-mail system 106 sends the stored message to a message converter 107 which converts the stored audio message to a .WAV file in a conventional and well known manner, or converts the stored audio message to text using well known and available voice-to-text software. The converted audio message, as either a .WAV file or a text file, is appended to an e-mail message addressed to the telephone number alias e-mail address of the called party, which telephone number is known to system as the telephone number associated with its subscriber. Thus, for example, if a calling party calls station set 104 at 732-555-6543 and leaves a message for John Brown who is a subscriber to the alias telephone number e-mail service, that message is converted by message converter 107 to either a text or a .WAV file, and is then forwarded via the Internet 109 to 7325556543@callatt.com, wherein the domain name callatt.com is an example of what could be a well advertised domain name to which alias telephone number messages are addressed. An e-mail message containing the stored text file or the .WAV file is then sent over the Internet 109 to a translation server 110 having the domain name callatt.com. Translation server 110 then translates the name "7325556543" to the actual e-mail address associated with the called party/subscriber having that telephone number alias name. Thus, translation server 110 accesses its associated database 111, whereby "7325556542" is translated to John Brown's actual e-mail address, jbrown@abc.com, for example. Although database 111 is shown in FIG. 1 as being separate from database 108 described above, in actual practice databases 108 and 111 could be combined in a single database that is connected to both IXC network 103 and translation server 110. Once the telephone number alias e-mail address is translated to the actual e-mail address of the called party, the e-mail message containing the text file or the .WAV file is forwarded over the Internet 109 to that called party/subscriber's actual e-mail address. That e-mail address can be associated with an e-mail server which is part of or an adjunct to the called party/subscriber's Internet Access Service Provider (IASP) 115 through which the called party/subscriber's terminal 116 gains access to the Internet. Alternatively, the actual e-mail address of the called party/subscriber may be associated with an e-mail server 117 connected to the Internet 109 that is not directly associated with IASP 115, but which is accessed by the subscriber through his or her client terminal 116. As shown in FIG. 1, client terminal 116 is connected to IASP 115 through LEC 105. That connection could alternatively be through a cable system, via a LAN, or any other facility which enables the subscriber to gain access to the Internet 109. Although network 109 is described above as being the Internet, network 109 can be any Internet-like packet-based computer network.

Once the message is delivered to the called party/subscriber's actual e-mail address, the subscriber can retrieve that message together with all other e-mail messages in a conventional manner. If the voice-mail message has been converted to a .WAV file, that message, using the appropriate plug-ins in the browser programs of client terminal 116, can be played through the speaker 118 of client terminal 116.

As described hereinabove, the calling party's message is stored by the voice-mail system 106 and sent as text or as a .WAV file to the alias telephone number e-mail address of the called party/subscriber. The voice-mail system 106 may include capabilities to determine the identity of the called party and create its own message which is forwarded to the called party/subscriber's alias e-mail address. For example, the voice-mail system 106 can determine the identity of the calling party from, for example, that party's Automatic Number Identification (ANI), and in a conventional voice-interactive manner question the calling party whether he or she wants the called party to return the call. Other messages could be similarly formulated. Thus, upon recognizing the calling party through his or her ANI and by requesting that the identified calling party press a specified touch-tone key for a return call, an e-mail message is created for the called party, which message is forwarded to that called party's alias telephone number e-mail address.

With reference to FIG. 2, the steps of the present invention are described. At step 201, the calling party calls a called party. At step 202, the calling party leaves a voice-mail system for the called party if the called party does not answer. At step 203, a database dip is performed to determine whether the called party is a subscriber to the alias telephone number e-mail system and can therefore be sent an e-mail message addressed to the telephone number alias e-mail address. After decision step 204, if the called party is not a subscriber, then at step 205 the voice message can only be retrieved by the called party directly through the voice-mail system. If the called party is determined to be a subscriber, then at step 206 the voice-mail message is converted to text or to a .WAV file. At step 207, the text or .WAV file is forwarded to a translation server at the subscriber's alias telephone number e-mail address. At step 208, the subscriber's actual e-mail address is determined and, at step 209, the e-mail message containing the text or .WAV file is forwarded to the subscriber's actual e-mail address. At step 210, the called party retrieves the message through his or her e-mail server and either reads or listens to it via their client terminal.

The above-described embodiment is illustrative of the principles of the present invention. Other embodiments could be devised by those skilled in the art without departing from the spirit and scope of the present invention.

The invention claimed is:

1. A method of delivering a message to a called party in response to a call from a calling party comprising the steps of:

receiving in a voice-mail system the call from the calling party for the called party when the called party is unavailable, determining if the called party is a subscriber to an alias telephone number e-mail system;

knowing the called party's telephone number;

if the called party is determined to be a subscriber to an alias telephone number e-mail system, formulating the message in response to the call in a file which can be transmitted on a computer network;

transmitting on the computer network an e-mail message including the file to an alias telephone number e-mail address associated with the called party, the alias telephone number e-mail address comprising the called party's telephone number at a domain name;

determining the called party's actual e-mail address; and forwarding the e-mail message to the called party's actual e-mail address.

2. The method of claim 1 wherein the message is a voice message from the calling party and the method further comprises the step of converting the voice message to a text file.

3. The method of claim 1 wherein the message is a voice message from the calling party and the method further comprises the step of converting the voice message to a .WAV file.

4. The method of claim 1 further comprising the step of determining the identity of the calling party wherein the message is automatically formulated in response to the identity of the calling party.

5. The method of claim 1 wherein the computer network is the Internet.

6. A method of delivering a voice message to a called party in response to a call from a calling party comprising the steps of:

receiving the voice message from the calling party for the called party when the called party is unavailable, determining if the called party is a subscriber to an alias telephone number e-mail system;

knowing the called party's telephone number;

if the called party is determined to be a subscriber to an alias telephone number e-mail system, converting the voice message into a form which can be transmitted on a computer network;

transmitting on the computer network to an alias telephone number e-mail address associated with the called party an e-mail message including the converted voice message, the alias telephone number e-mail address comprising the called part's telephone number at a domain name;

determining the called party's actual e-mail address; and forwarding the e-mail message to the called party's actual e-mail address.

7. The method of claim 6 wherein the step of converting converts the voice message to a text file.

8. The method of claim 6 wherein the step of converting converts the voice message to a .WAV file.

9. The method of claim 6 wherein the computer network is the Internet.

10. A network-based system for delivering a message to a called party in reponse to a call from a calling party comprising:

a network-based voice-mail system which receives the call from the calling party for the called party when the subscriber is unavailable;

means for determining whether the called party is a subscriber to an alias telephone number e-mail system;

means for formulating the message in response to the call in a file which can be transmitted on a computer network if the called party is determined to be a subscriber to an alias telephone number e-mail system;

means for transmitting on the computer network to the called party's alias telephone number e-mail address an e-mail message including the file, the called party's alias telephone number e-mail address comprising the called party's telephone number at a domain name;

a database for storing the called party telephone number and its corresponding, actual e-mail address;

means for translating the alias telephone number e-mail address of the call party comprising the called party's telephone number to the called party's actual e-mail address; and means for forwarding the e-mail message to the called party's actual e-mail address.

11. The system of claim 10 wherein the message is a voice message from the calling party, and the means for formulating converts the voice message to a text file.

12. The system of claim 10 wherein the message is a voice message from the calling party, and the means for formulating converts the voice message to a .WAV file.

13. The system of claim 10 further comprising means for determining the identity of the calling party, the means for formulating automatically formulating the message in response to the identity of the calling party.

14. The system of claim 10 wherein the computer network is the Internet.

15. A network-based system for delivering a voice message to a called party in reponse to a call from a calling party comprising:

a network-based voice-mail system which receives the call from the calling party for the called party when the called party is unavailable;

means for determining whether the called party is a subscriber to an alias telephone number e-mail system;

means for converting the voice message for the called party into a form which can be transmitted on a computer network if the called party is determined to be a subscriber to an alias telephone number e-mail system;

means for transmitting on the computer network to the called party's alias telephone number e-mail address an e-mail message including the converted message for the caled party the called party's alias telephone number e-mail address comprising the called party's telephone number at a domain name;

a database for storing the called party's telephone number and its corresponding, actual e-mail address;

means for translating the alias telephone number e-mail address of the called party to the called party's actual e-mail address; and means for forwarding the e-mail message to the called party's actual e-mail address.

16. The system of claim 15 wherein the means for converting converts the voice message to a text file.

17. The system of claim 15 wherein the means for converting converts the voice message to a .WAV file.

18. The system of claim 15 wherein the computer network is the Internet.

19. A method of delivering a text message corresponding to a voice message to a called party when the called party is not available comprising the steps of receiving a voice message in a voice-mail system for the called party when the called party is not available, converting the voice message to a text message and delivering the text message to the called party at the called party's e-mail address characterized by the steps of storing at a database the called party's telephone number and its associated actual e-mail address;

transmitting the text message to an alias e-mail address comprising at least in part the called party's telephone number at a domain name; and converting the alias e-mail address to the associated actual e-mail address for delivery of the converted text message.

20. A network-based system for delivering a text message corresponding to a voice message to a called party when the called party is not available comprising voice-mail apparatus for receiving a voice message in a voice-mail system when the called party is not available, a voice to text converter for converting the voice message to a text message and a transmitter for transmitting the text message to the called party at the called party's actual e-mail address characterized by a database for storing a called party telephone number associated with an actual e-mail address and and a translation server coupled to said database and responsive to receipt of an alias e-mail address comprising at least in part the called party's telephone number at a domain name from an e-mail server, said translation server for translating said alias e-mail address to its corresponding actual e-mail address for delivery of said converted message to said actual e-mail address.

* * * * *